US010585418B2

(12) United States Patent
Ikai et al.

(10) Patent No.: US 10,585,418 B2
(45) Date of Patent: Mar. 10, 2020

(54) CONTROL SYSTEM OF MACHINE TOOL

(71) Applicant: FANUC CORPORATION, Yamanashi (JP)

(72) Inventors: Satoshi Ikai, Yamanashi (JP); Shoutarou Hashimoto, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/947,981

(22) Filed: Apr. 9, 2018

(65) Prior Publication Data

US 2018/0307202 A1   Oct. 25, 2018

(30) Foreign Application Priority Data

Apr. 20, 2017  (JP) ................. 2017-083756

(51) Int. Cl.
  *G05B 19/4067*  (2006.01)
  *G06T 7/13*  (2017.01)
  (Continued)

(52) U.S. Cl.
  CPC ....... *G05B 19/4067* (2013.01); *G05B 19/402* (2013.01); *G05B 19/4086* (2013.01);
  (Continued)

(58) Field of Classification Search
  CPC ............ G05B 19/4067; G05B 19/4086; G05B 19/402; G05B 2219/37435; G05B 2219/35514; G06T 7/13; G06T 1/60
  See application file for complete search history.

(56) References Cited

U.S. PATENT DOCUMENTS

| 5,768,137 A | 6/1998 | Polidoro et al. |
| 5,871,391 A | 2/1999 | Pryor |

(Continued)

FOREIGN PATENT DOCUMENTS

| CA | 2986736 | 12/2018 |
| CN | 1211488 | 3/1999 |

(Continued)

OTHER PUBLICATIONS

Notification of Reasons for Refusal dated Sep. 25, 2018 in Japanese Patent Application No. 2017-048903.
(Continued)

*Primary Examiner* — Christopher E. Everett
(74) *Attorney, Agent, or Firm* — Wenderoth, Lind & Ponack, L.L.P.

(57) ABSTRACT

A control system of a machine tool includes an analysis device, the analysis device includes acquisition portions which acquire chronological control data when a work is machined and which acquire spatial machined surface measurement data after the machining of the work, a storage portion which stores the control data and the machined surface measurement data, a data-associating processing portion which associates the control data and the machined surface measurement data with each other in two machining directions, a machined surface failure detection portion which detects a failure on the machined surface of the work and a location thereof based on the machined surface measurement data in the two machining directions and an identification portion which identifies a drive axis that causes the failure from the detected failure and the machining direction of the control data corresponding to the detected failure location.

10 Claims, 8 Drawing Sheets

(51) Int. Cl.
  *G05B 19/402* (2006.01)
  *G05B 19/408* (2006.01)
  *G06T 1/60* (2006.01)

(52) U.S. Cl.
  CPC .................. *G06T 1/60* (2013.01); *G06T 7/13* (2017.01); *G05B 2219/35514* (2013.01); *G05B 2219/37435* (2013.01)

(56) References Cited

U.S. PATENT DOCUMENTS

| | | | |
|---|---|---|---|
| 6,449,526 | B1 | 9/2002 | Sachs et al. |
| 2001/0024097 | A1 | 9/2001 | Kunugi et al. |
| 2008/0115856 | A1 | 5/2008 | Altenhoner |
| 2010/0057257 | A1 | 3/2010 | Ichikawa |
| 2010/0207567 | A1* | 8/2010 | Mori .................. B23Q 17/22 318/632 |
| 2014/0087628 | A1 | 3/2014 | Bharadwaj |
| 2014/0148939 | A1 | 5/2014 | Nakano et al. |
| 2014/0157610 | A1* | 6/2014 | Garvey .................. G01B 21/04 33/503 |
| 2016/0054724 | A1 | 2/2016 | Oda |
| 2017/0300034 | A1 | 10/2017 | Nagaoka et al. |
| 2018/0133901 | A1* | 5/2018 | Kuno .................. B25J 13/085 |
| 2018/0267505 | A1 | 9/2018 | Shinoda et al. |
| 2018/0275639 | A1 | 9/2018 | Shinoda et al. |
| 2018/0307202 | A1 | 10/2018 | Ikai et al. |

FOREIGN PATENT DOCUMENTS

| | | |
|---|---|---|
| CN | 101145047 | 3/2008 |
| CN | 101722438 | 6/2010 |
| CN | 101813931 | 8/2010 |
| CN | 101866163 | 10/2010 |
| CN | 101984379 | 3/2011 |
| CN | 102029546 | 4/2011 |
| CN | 103029131 | 4/2013 |
| CN | 104540467 | 4/2015 |
| CN | 104889829 | 9/2015 |
| CN | 105388842 | 3/2016 |
| CN | 105404236 | 3/2016 |
| CN | 106325209 | 1/2017 |
| CN | 106406228 | 2/2017 |
| DE | 10 2007 063 318 | 3/2009 |
| DE | 10 2015 119 240 | 3/2017 |
| JP | 2006-255826 | 9/2006 |
| JP | 2007-190628 | 8/2007 |
| JP | 2010-054399 | 3/2010 |
| JP | 2010-262474 | 11/2010 |
| JP | 2011-095879 | 5/2011 |
| JP | 2014-010687 | 1/2014 |
| JP | 2014-164597 | 9/2014 |
| JP | 2016-57843 | 4/2016 |
| JP | 2016-078150 | 5/2016 |
| JP | 2016-140899 | 8/2016 |
| JP | 2017-13178 | 1/2017 |
| JP | 2017-054463 | 3/2017 |

OTHER PUBLICATIONS

Office Action dated Apr. 2, 2019 in Chinese Patent Application No. 201810241571.2.
Office Action dated Mar. 22, 2019 in U.S. Appl. No. 15/928,163.
Office Action dated Jun. 20, 2019 in U.S. Appl. No. 15/952,487.
Office Action dated Jun. 3, 2019 in Chinese Patent Application No. 201810200632.0.
Office Action dated Aug. 15, 2019 in Chinese Application No. 201810325683.6.
Office Action dated Aug. 26, 2019 in Chinese Application No. 201810348993.X.
Office Action dated Sep. 24, 2019 in German Application No. 102018002303.7.
Office Action dated Dec. 12, 2019 in U.S. Appl. No. 15/914,699.

* cited by examiner

CONTROL SYSTEM OF MACHINE TOOL

This application is based on and claims the benefit of priority from Japanese Patent Application No. 2017-083756, filed on 20 Apr. 2017, the content of which is incorporated herein by reference.

BACKGROUND OF THE INVENTION

Field of the Invention

The present invention relates to the control system of a machine tool which machines a work.

Related Art

A machine tool machines a work while moving at least one of the work (the item to be machined) and a tool along predetermined drive axes. In other words, the machine tool machines the work while varying a relative position of the work and the tool.

When the work is machined with the machine tool described above, a stripe pattern (failure) may occur on the machined surface of the work. In other words, streaks or stripes may occur at predetermined intervals. Protrusions may occur on the machined surface of the work due to a delay in the reversal of the drive axis caused such as by a backlash or any other cause.

Hence, for example, Patent Documents 1 and 2 disclose technologies in which based on the movement path of the tip of a tool when a work is machined, a stripe pattern (failure) on the machined surface of the work is detected.

Patent Document 1: Japanese Unexamined Patent Application, Publication No. 2016-57843

Patent Document 2: Japanese Unexamined Patent Application, Publication No. 2017-13178

SUMMARY OF THE INVENTION

The inventors et al. of the present application have attempted an approach different from the technologies disclosed in Patent Documents 1 and 2 in order to detect a failure on the machined surface of a work. Specifically, as another method of detecting the failure on the machined surface of the work, after the machining of the work, a vision sensor or the like is used to sense an image of the machined surface of the work, image processing is performed on the data of the sensed image and thus the failure (streaks or stripes or protrusions) on the machined surface are detected. In other words, the failure on the machined surface is detected from spatial machined surface measurement data after the machining of the work.

The present invention has an object to provide the control system of a machine tool which identifies, based on failure information detected from spatial machined surface measurement data after the machining of a work, a drive axis that causes the occurrence of a failure on the machined surface of the work.

(1) A control system (for example, a numerical control system 100 of a machine tool which will be described later) of a machine tool according to the present invention which machines a work (for example, a work W which will be described later), includes: a control device (for example, a numerical control device 50 which will be described later) which controls drive axes of the machine tool (for example, a machine tool 10 which will be described later) based on control data; a machined surface measurement device (for example, a machined surface measurement device 20 which will be described later) which measures a machined surface of the work; and an analysis device (for example, a machined surface failure analysis device 30 which will be described later) which analyzes a failure on the machined surface of the work, where the analysis device includes: a first acquisition portion (for example, a drive axis control data acquisition portion 31 which will be described later) which acquires, from the control device, the chronological control data when the work is machined; a second acquisition portion (for example, a machined surface measurement data acquisition portion 32 which will be described later) which acquires spatial machined surface measurement data after the machining of the work measured by the machined surface measurement device; a storage portion (for example, a storage portion 33 which will be described later) which stores the chronological control data acquired by the first acquisition portion and the spatial machined surface measurement data acquired by the second acquisition portion when the work is machined in at least two machining directions; a data-associating processing portion (for example, a data-associating processing portion 34 which will be described later) which associates, with each other, the chronological control data and the spatial machined surface measurement data stored in the storage portion when the work is machined in at least the two machining directions; a machined surface failure detection portion (for example, a machined surface failure detection portion 35 which will be described later) which detects the failure on the machined surface of the work and a location thereof based on the spatial machined surface measurement data stored in the storage portion when the work is machined in at least the two machining directions; and an identification portion (for example, a failure cause drive axis identification portion 36 which will be described later) which identifies the drive axis that causes the failure detected by the machined surface failure detection portion based on the control data and the machined surface measurement data associated with each other by the data-associating processing portion from the failure detected by the machined surface failure detection portion and the machining direction of the control data corresponding to the failure location detected by the machined surface failure detection portion.

(2) In the control system of the machine tool according to (1), the analysis device may further include a machining program analysis portion (for example, a machining program analysis portion 38 which will be described later) which analyzes a machining program in the control device so as to set at least the two machining directions, and the control device may change the machining program according to the machining directions set by the machining program analysis portion so as to change the machining direction.

(3) In the control system of the machine tool according to (1), the analysis device may further include a machining direction determination portion (for example, an optimum machining direction determination portion 37 which will be described later) which determines the machining direction so as to reduce a drive ratio of the drive axis that causes the failure identified by the identification portion, and the control device may change the machining program according to the machining direction determined by the machining direction determination portion so as to change the machining direction.

(4) In the control system of the machine tool according to (3), the control device may change the angle of the work according to the change of the machining direction.

(5) In the control system of the machine tool according to any one of (1) to (4), the control data acquired by the first acquisition portion may be position control data of the drive axes of the machine tool, the data-associating processing portion may produce a first work shape image based on the chronological position control data, may produce a second work shape image based on the spatial machined surface measurement data and may associate the chronological position control data and the spatial machined surface measurement data with each other so as to superimpose the first work shape image and the second work shape image on each other.

(6) In the control system of the machine tool according to (5), the chronological position control data may be machine coordinate information, and the spatial machined surface measurement data may be machine coordinate information which is calculated based on a machine coordinate of the machined surface measurement device.

(7) In the control system of the machine tool according to any one of (1) to (4), the first acquisition portion may acquire, from the control device, chronological position control data and chronological speed control data when the work is machined which are position control data and speed control data of the drive axes of the machine tool and which are associated with each other, and the data-associating processing portion: may detect, based on a variation in the chronological speed control data, as an edge position of the work, a machining start position and a machining completion position so as to produce a first work shape image; may detect, based on the spatial machined surface measurement data, an edge position of the work so as to produce a second work shape image; may associate the chronological speed control data and the spatial machined surface measurement data with each other so as to superimpose the edge position of the first work shape image and the edge position of the second work shape image on each other; and may associate the chronological speed control data and the chronological position control data with each other so as to associate the chronological position control data and the spatial machined surface measurement data with each other.

(8) In the control system of the machine tool according to any one of (1) to (4), the first acquisition portion may acquire, from the control device, chronological position control data and chronological speed control data when the work is machined which are position control data and speed control data of the drive axes of the machine tool and which are associated with each other, and the data-associating processing portion: may detect, based on a variation in a value obtained by subtracting a value corresponding to a variation in acceleration/deceleration from the chronological speed control data, as an edge position of the work, a machining start position and a machining completion position so as to produce a first work shape image; may detect, based on the spatial machined surface measurement data, an edge position of the work so as to produce a second work shape image; may associate the chronological speed control data and the spatial machined surface measurement data with each other so as to superimpose the edge position of the first work shape image and the edge position of the second work shape image on each other; and may associate the chronological speed control data and the chronological position control data with each other so as to associate the chronological position control data and the spatial machined surface measurement data with each other.

(9) In the control system of the machine tool according to any one of (1) to (8), the failure on the machined surface of the work may be a streak or a stripe or a protrusion.

(10) In the control system of the machine tool according to (1), the control data may be a command value or a feedback value, the command value may be a position command value, a speed command value or a torque command value and the feedback value may be a position feedback value, a speed feedback value or a current feedback value.

According to the present invention, it is possible to provide the control system of a machine tool which identifies, based on failure information detected from image data of the machined surface of a work, a drive axis that causes the occurrence of a failure on the machined surface of the work.

DETAILED DESCRIPTION OF THE INVENTION

Figure 1:
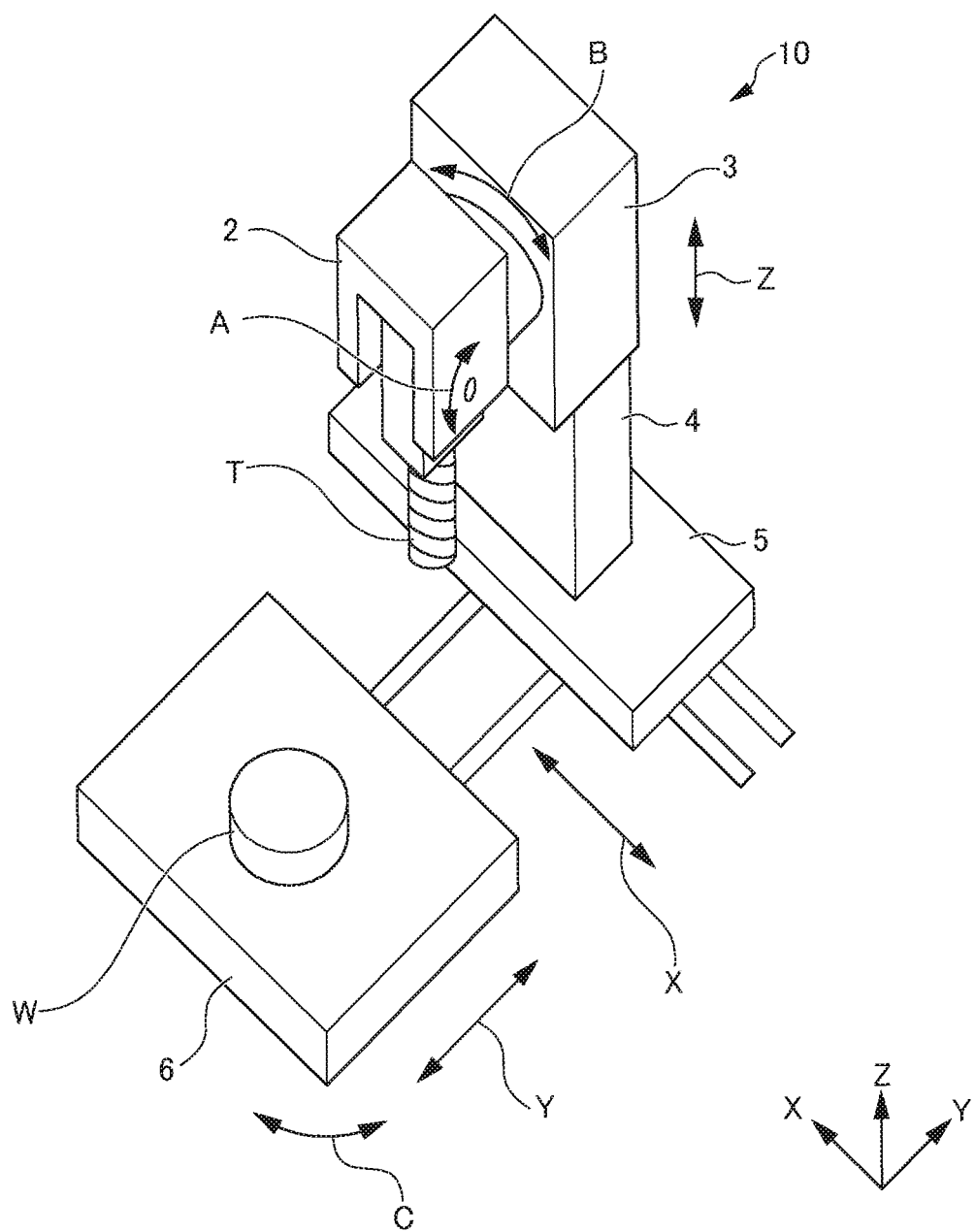
FIG. 1 is a perspective view showing an example of the configuration of a machine tool according to an embodiment of the present invention.

Examples of the embodiment of the present invention will be described below with reference to accompanying drawings. In the drawings, the same or corresponding portions are identified with the same symbols.

(Machine Tool)

An example of a machine tool in a numerical control system according to the embodiment of the present invention will first be described. FIG. 1 is a perspective view showing an example of the configuration of the machine tool according to the embodiment of the present invention. This machine tool 10 is a machine tool which performs machining. The machine tool in the numerical control system of the present invention is not limited to this machine tool, and may be an arbitrary industrial machine.

The machine tool 10 shown in FIG. 1 includes a head 2, a support member 3 which movably supports the head 2, a support column 4 which movably supports the support member 3, a base 5 which supports the support column 4 and a table 6. A tool T such as an end mill is fitted to the head 2, and a work W is mounted on the table 6. The machine tool 10 includes a drive device (unillustrated) and a numerical control device (unillustrated).

The drive device includes servomotors which will be described later. The drive device moves the base 5 in the direction of an X axis (arrow X), moves the table 6 in the direction of a Y axis (arrow Y) and moves the support member 3 in the direction of a Z axis (arrow Z). Furthermore, the drive device turns the tool T in the direction of an A axis (arrow A) with respect to the head 2, turns the head 2 in the direction of a B axis (arrow B) with respect to the support member 3 and turns the table 6 in the direction of a C axis (arrow C) with respect to the head 2.

The numerical control device controls the drive device so as to control drive axes formed with the three directly moved axes (the X axis, the Y axis and the Z axis) and the three rotation axes (the A axis, the B axis and the C axis), and thereby controls the relative position of the tool T with respect to the work W and the posture thereof. In this way, the machine tool 10 machines the work W while changing the relative position of the tool T with respect to the work W and the posture thereof.

In the machine tool 10 as described above, when the work W is machined, a failure (streaks or stripes) may occur on the machined surface of the work W due to any cause such as vibrations. For example, vibrations are transmitted to the head 2 holding the tool T or the table 6 holding the work W, and thus the tool T or the work W may be vibrated. For example, when the direction of movement of the head 2 or the table 6 is switched at the time of machining, vibrations occur.

Vibrations are also transmitted from a fan motor in an inverter or the like within the machine tool 10 or various machines or the like outside the machine tool 10. When the tool T or the work W is vibrated by the vibrations of the machine tool 10 as described above, a failure may occur on the machined surface of the work W.

The failure (streaks or stripes) as described above can be detected by using, after the machining of the work W, a vision sensor or the like to sense an image of the machined surface of the work W, and performing image processing on the data of the sensed image. Then, based on the failure on the machined surface of the work W which is machined by changing a machining direction and the machining direction based on control data at that time, a drive axis which causes the occurrence of the failure can be identified.

The present invention relates to a numerical control system in a machine tool which identifies, based on failure information detected from spatial machined surface measurement data such as image data after the machining of a work, a drive axis that causes the occurrence of a failure on the machined surface of the work.

(Numerical Control System of Machine Tool)

Figure 2:
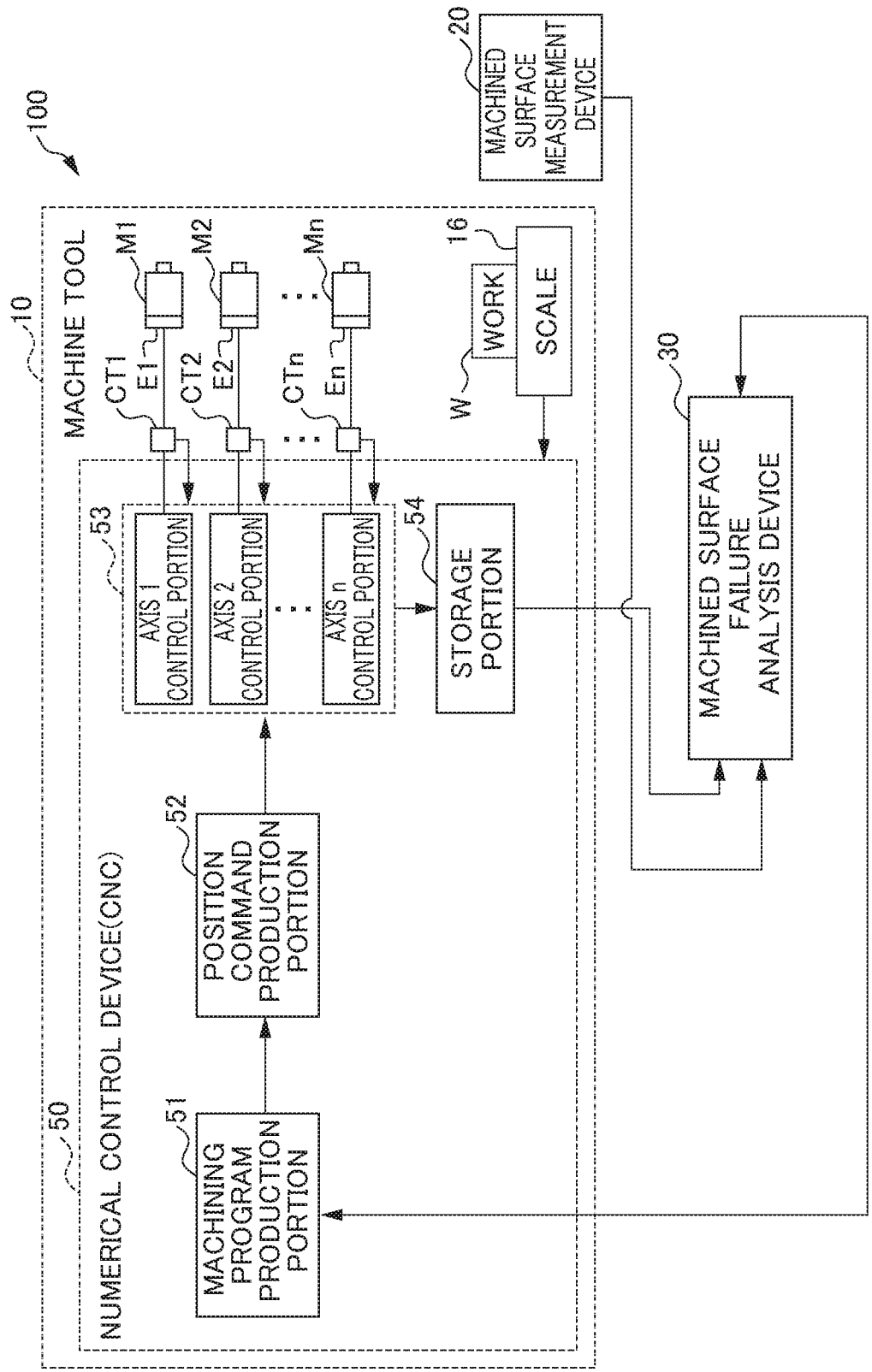
FIG. 2 is a diagram showing the configuration of a numerical control system in the machine tool according to the embodiment of the present invention.
Figure 3:
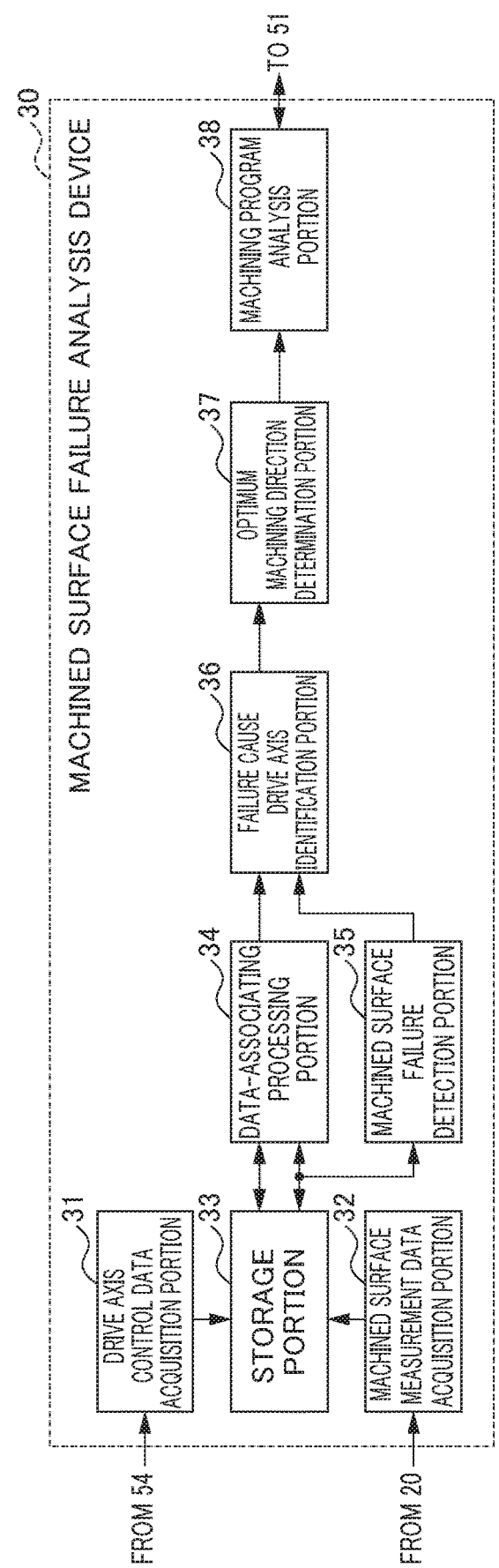
FIG. 3 is a diagram showing the configuration of a machined surface failure analysis device shown in FIG. 2.

The numerical control system of the machine tool according to the embodiment of the present invention will then be described. FIG. 2 is a diagram showing the configuration of the numerical control system in the machine tool according to the embodiment of the present invention. FIG. 3 is a diagram showing the configuration of a machined surface failure analysis device shown in FIG. 2. The numerical control system 100 of the machine tool shown in FIGS. 2 and 3 includes the machine tool 10 described above, a machined surface measurement device 20 and a machined surface failure analysis device 30.

Although in the machine tool 10 described above, the six drive axes (the X axis, the Y axis, the Z axis, the A axis, the B axis and the C axis) are illustrated, the machine tool 10 of the present embodiment includes n drive axes. The machine tool 10 includes n servomotors M1, M2 . . . and Mn corresponding to the drive device described above, encoders (position/speed detectors) E1, E2 . . . and En which are respectively provided in the servomotors thereof, current detectors CT1, CT2 . . . and CTn, a scale (position detector) 16 and a numerical control device (CNC) 50. In FIG. 2, only the configuration of the machine tool 10 which is related to the characteristics of the present invention is shown, and the other configurations are omitted.

The servomotors M1, M2 . . . and Mn respectively drive the n drive axes by the control of the numerical control device 50. The encoders E1, E2 . . . and En respectively detect the rotation positions of the servomotors M1, M2 . . . and Mn, and transmit the detected rotation positions to the numerical control device 50 as position feedback values. The encoders E1, E2 . . . and En respectively detect the rotation speeds of the servomotors M1, M2 . . . and Mn, and transmits the detected rotation speeds to the numerical control device 50 as speed feedback values.

The current detectors CT1, CT2 . . . and CTn respectively detect the drive current values of the servomotors M1, M2 . . . and Mn, and transmits the detected current values to the numerical control device 50 as current feedback values (actual current values).

For example, the scale 16 is provided in the table 6 on which the work W described above is mounted. The scale 16 detects the position of the work W, and transmits the detected position to the numerical control device 50 as a position feedback value.

The numerical control device 50 generates torque command values (current command values) for the drive axes based on position command values (movement command values) for the drive axes based on a machining program related to the machining of the work W, the position feedback value from the scale 16 or the position feedback values from the encoders E1, E2 . . . and En, the speed feedback values from the encoders E1, E2 . . . and En and the current feedback values from the current detectors CT1, CT2 . . . and CTn, and drives the servomotors M1, M2 . . . and Mn with these torque command values.

Specifically, the numerical control device 50 includes a machining program production portion 51, a position command production portion 52, an individual axis control portion 53 and a storage portion 54. The machining program production portion 51 produces a machining program related to the machining of the work W. The machining program production portion 51 changes, based on machining direction information from the machined surface failure analysis device 30, the machining program so as to change the machining direction (machining angle). The position command production portion 52 produces, based on the machining program produced by the machining program production portion 51, the position command values (movement command values) for the drive axes. The individual axis control portion 53 generates speed command values for the drive axes based on differences between the position command values and the position feedback values, and generates the torque command values (current command values) for the drive axes based on differences between the speed command values and the speed feedback values. The individual axis control portion 53 generates drive currents for the drive axes based on differences between the torque command values (current command values) and the current feedback values.

The storage portion 54 stores control data for the individual axes from the individual axis control portion 53.

The control data includes position control data (position command values, position feedback values), speed control data (speed command values, speed feedback values) and torque control data (torque command values, current feedback values). The storage portion 54 is, for example, a rewritable memory such as an EEPROM.

The numerical control device 50 is formed with, for example, a computation processor such as a DSP (Digital Signal Processor) or an FPGA (Field-Programmable Gate Array). The various types of functions of the numerical control device 50 are realized by executing predetermined software (programs and applications) stored in the storage portion. The various types of functions of the numerical control device 50 may be realized by the cooperation of hardware and software or may be realized only by hardware (electronic circuit).

The machined surface measurement device 20 is a device which measures the work W so as to measure the machined surface of the work W. Specific examples of the machined surface measurement device 20 include a vision sensor, an optical microscope, a laser microscope and a three-dimensional coordinate measurement device. The machined surface measurement device 20 transmits the image data or the position data of the work W measured to the machined surface failure analysis device 30. The machined surface measurement device 20 is provided in, for example, a measurement stage, a fixing stage or an end factor of a robot outside the machine tool 10. The machined surface measurement device 20 may be incorporated in the machine tool 10.

The machined surface failure analysis device 30 is a device which analyzes the failure (streaks or stripes) on the machined surface of the work W. The machined surface failure analysis device 30 includes a drive axis control data acquisition portion (first acquisition portion) 31, a machined surface measurement data acquisition portion (second acquisition portion) 32, a storage portion 33, a data-associating processing portion 34, a machined surface failure detection portion 35, a failure cause drive axis identification portion 36, an optimum machining direction determination portion 37 and a machining program analysis portion 38.

The drive axis control data acquisition portion 31 acquires chronological drive axis control data stored in the storage portion 54 of the numerical control device 50 when the work W is machined. Specifically, the drive axis control data acquisition portion 31 acquires, as the drive axis control data, the position control data (the position command values, the position feedback values of the work W detected by the scale 16 or the position feedback values of the servomotors M1, M2 . . . and Mn detected by the encoders E1, E2 . . . and En) (position information (machine information) of the drive axes).

The machined surface measurement data acquisition portion 32 acquires the spatial machined surface measurement data after the machining of the work W measured by the machined surface measurement device 20. Specifically, the machined surface measurement data acquisition portion 32 acquires, as the machined surface measurement data, three-dimensional image data or position data (coordinate data).

The storage portion 33 stores the chronological position control data acquired by the drive axis control data acquisition portion 31 and the spatial machined surface measurement data measured by the machined surface measurement device 20. More specifically, the storage portion 33 stores the chronological position control data and the spatial machined surface measurement data when the work W is machined in two different machining directions α and β. The storage portion 33 is, for example, a rewritable memory such as an EEPROM.

The data-associating processing portion 34 associates, with each other, the chronological position control data and the spatial machined surface measurement data in the machining direction α which are stored in the storage portion 33. The data-associating processing portion 34 also associates, with each other, the chronological position control data and the spatial machined surface measurement data in the machining direction β which are stored in the storage portion 33.

Furthermore, the data-associating processing portion 34 associates, with each other, the association data of the chronological position control data and the spatial machined surface measurement data in the machining direction α and the association data of the chronological position control data and the spatial machined surface measurement data in the machining direction β. The details of data-associating processing will be described later.

The machined surface failure detection portion 35 detects, based on the spatial machined surface measurement data in the machining direction α stored in the storage portion 33, the failure (streaks or stripes) on the machined surface of the work W when the work W is machined in the machining direction α and the location thereof. The machined surface failure detection portion 35 also detects, based on the spatial machined surface measurement data in the machining direction β stored in the storage portion 33, the failure (streaks or stripes) on the machined surface of the work W when the work W is machined in the machining direction β and the location thereof.

The failure cause drive axis identification portion 36 identifies the drive axis that causes the failure based on the position control data and the machined surface measurement data associated with each other by the data-associating processing portion 34 from the failure detected by the machined surface failure detection portion 35 and the machining direction of the position control data corresponding to the failure location.

The optimum machining direction determination portion 37 determines the machining direction so as to reduce a drive ratio of the drive axis that is identified by the failure cause drive axis identification portion 36 and that causes the failure.

The machining program analysis portion 38 analyzes the machining program in the numerical control device 50 so as to determine the machining direction β which is based on the current machining program and which is different from the machining direction α. The machining program analysis portion 38 also transmits the machining direction determined by the optimum machining direction determination portion 37 to the numerical control device 50.

The machined surface failure analysis device 30 is formed with, for example, a computation processor such as a DSP (Digital Signal Processor) or an FPGA (Field-Programmable Gate Array). The various types of functions of the machined surface failure analysis device 30 are realized by executing predetermined software (programs and applications) stored in the storage portion (unillustrated). The various types of functions of the machined surface failure analysis device 30 may be realized by the cooperation of hardware and software or may be realized only by hardware (electronic circuit).

The various types of functions of the machined surface failure analysis device 30 may be realized in the numerical control device 50 of the machine tool 10.

The data-associating processing and the machined surface failure analysis processing performed by the machined surface failure analysis device 30 of the numerical control system 100 in the machine tool of the present embodiment will then be described with reference to FIGS. 4 to 7. FIG.

Figure 5:
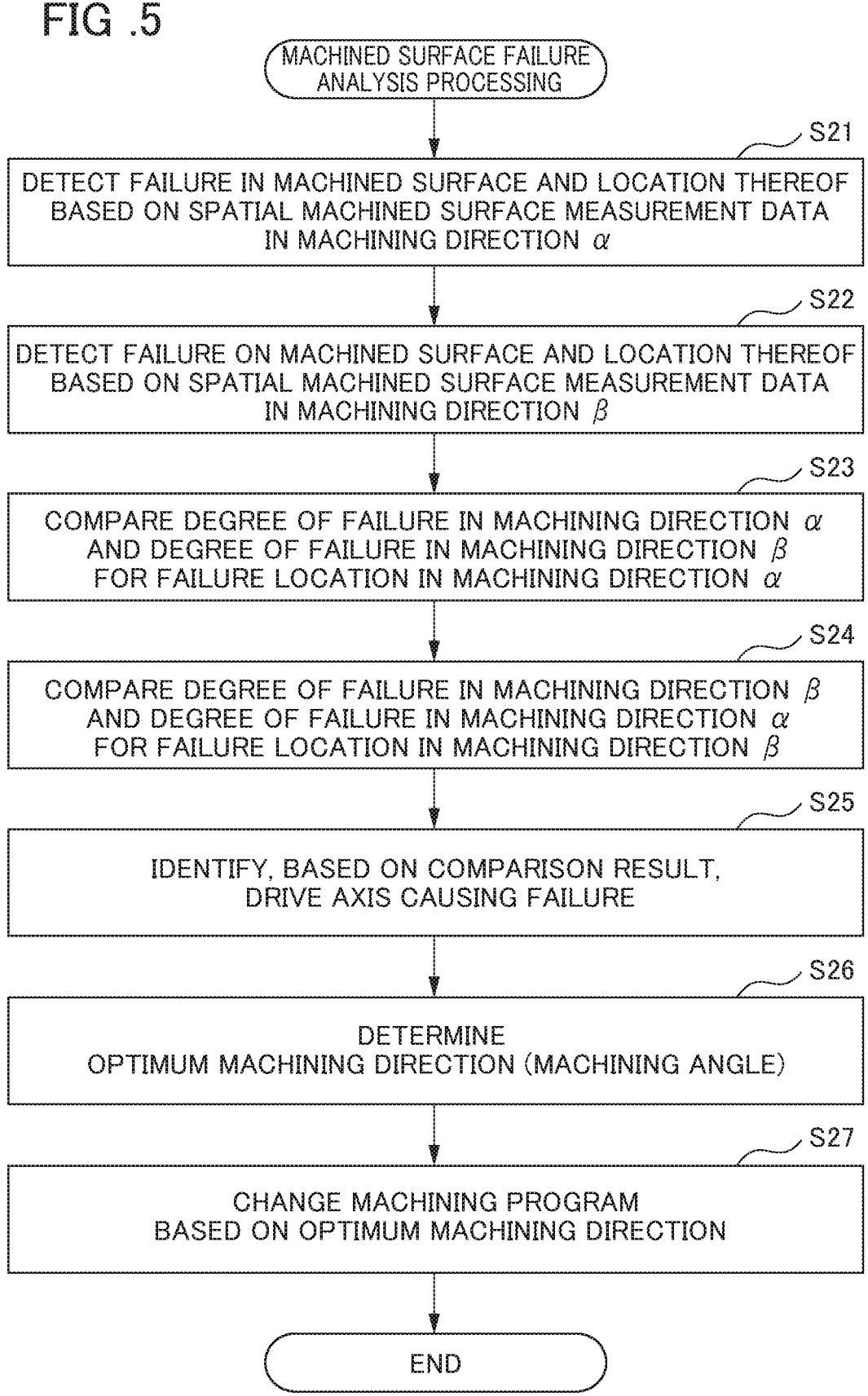
FIG. 5 is a flowchart showing machined surface failure analysis processing performed by the machined surface failure analysis device of the numerical control system in the machine tool according to the embodiment of the present invention.
Figure 6:
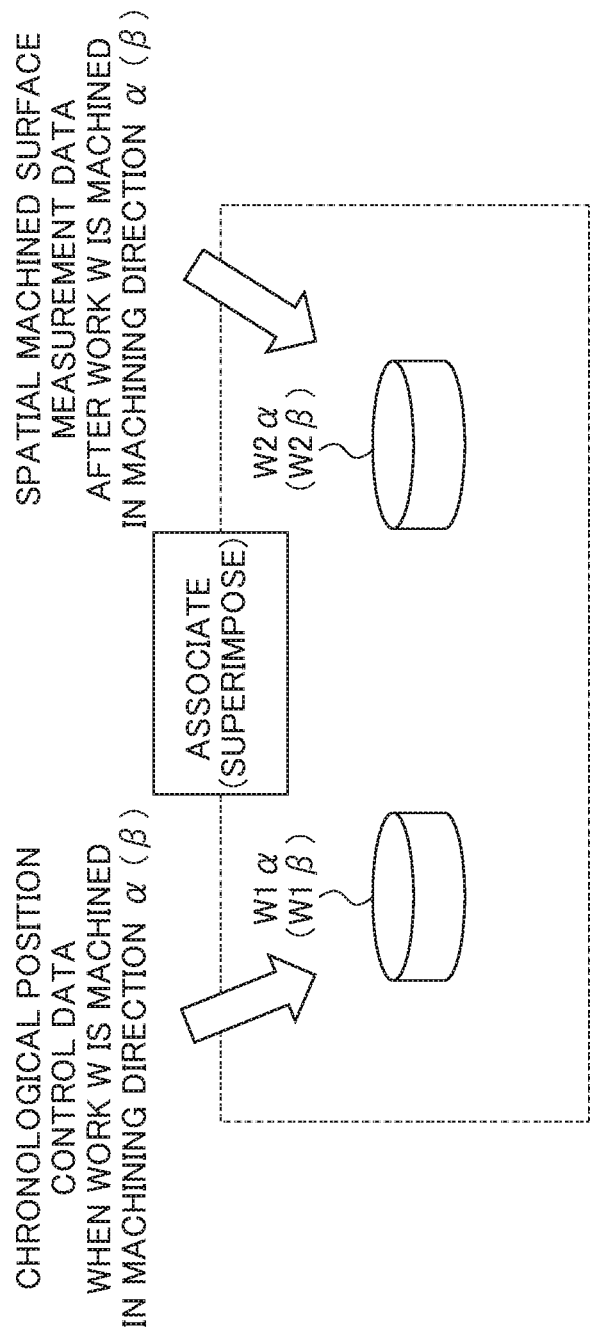
FIG. 6 is a diagram schematically showing the data-associating processing.
Figure 7:
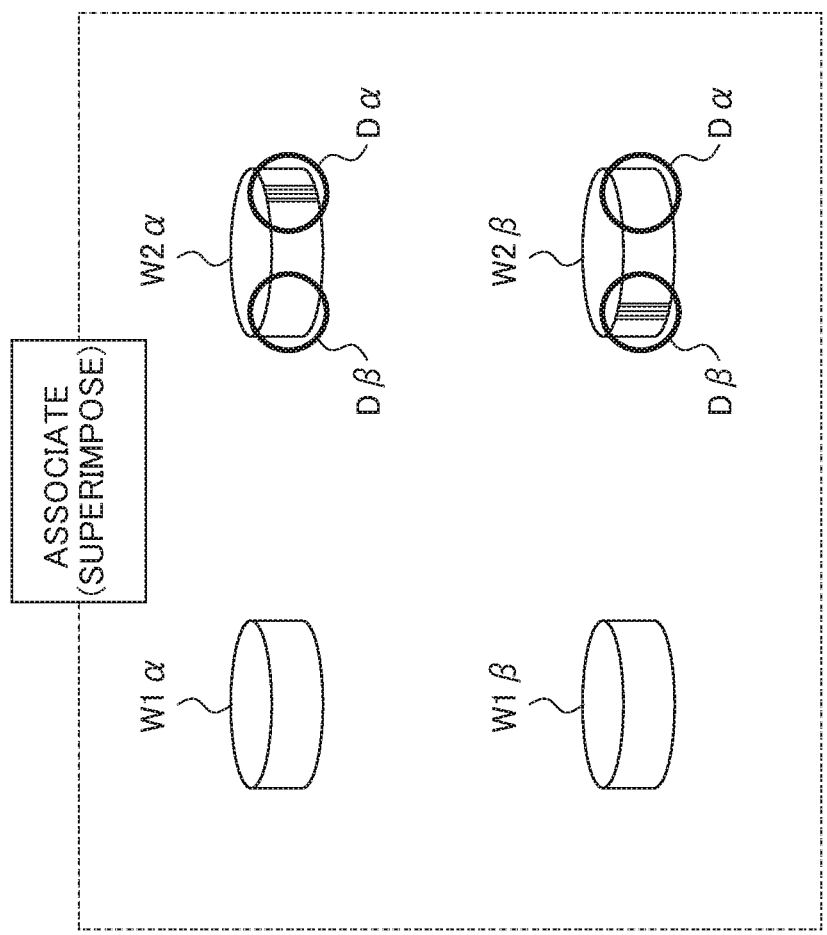
FIG. 7 is a diagram schematically showing the data-associating processing and the machined surface failure analysis processing.

4 is a flowchart showing the data-associating processing performed by the machined surface failure analysis device 30 of the numerical control system 100 in the machine tool of the present embodiment. FIG. 5 is a flowchart showing the machined surface failure analysis processing performed by the machined surface failure analysis device 30 of the numerical control system 100 in the machine tool of the present embodiment. FIG. 6 is a diagram schematically showing the data-associating processing. FIG. 7 is a diagram schematically showing the data-associating processing and the machined surface failure analysis processing.

(Data-Associating Processing)

The machining program production portion 51 of the numerical control system 50 first produces a machining program for machining the work W in the machining direction α (machining angle). In this way, the work W is machined in the machining direction α by the machine tool 10.

When the work W is machined, the numerical control device 50 controls the drive axes based on the position command values, the speed command values and the torque command values (current command values) for the drive axes based on the machining program, the position feedback values from the scale 16 (or the position feedback values from the encoders E1, E2 . . . and En), the speed feedback values from the encoders E1, E2 . . . and En and the current feedback values (actual current values and actual torque values) from the current detectors CT1, CT2 . . . and CTn, and thereby controls the relative position of the tool T with respect to the work W and the posture thereof, with the result that the work W is machined in the machining direction α.

Figure 4:
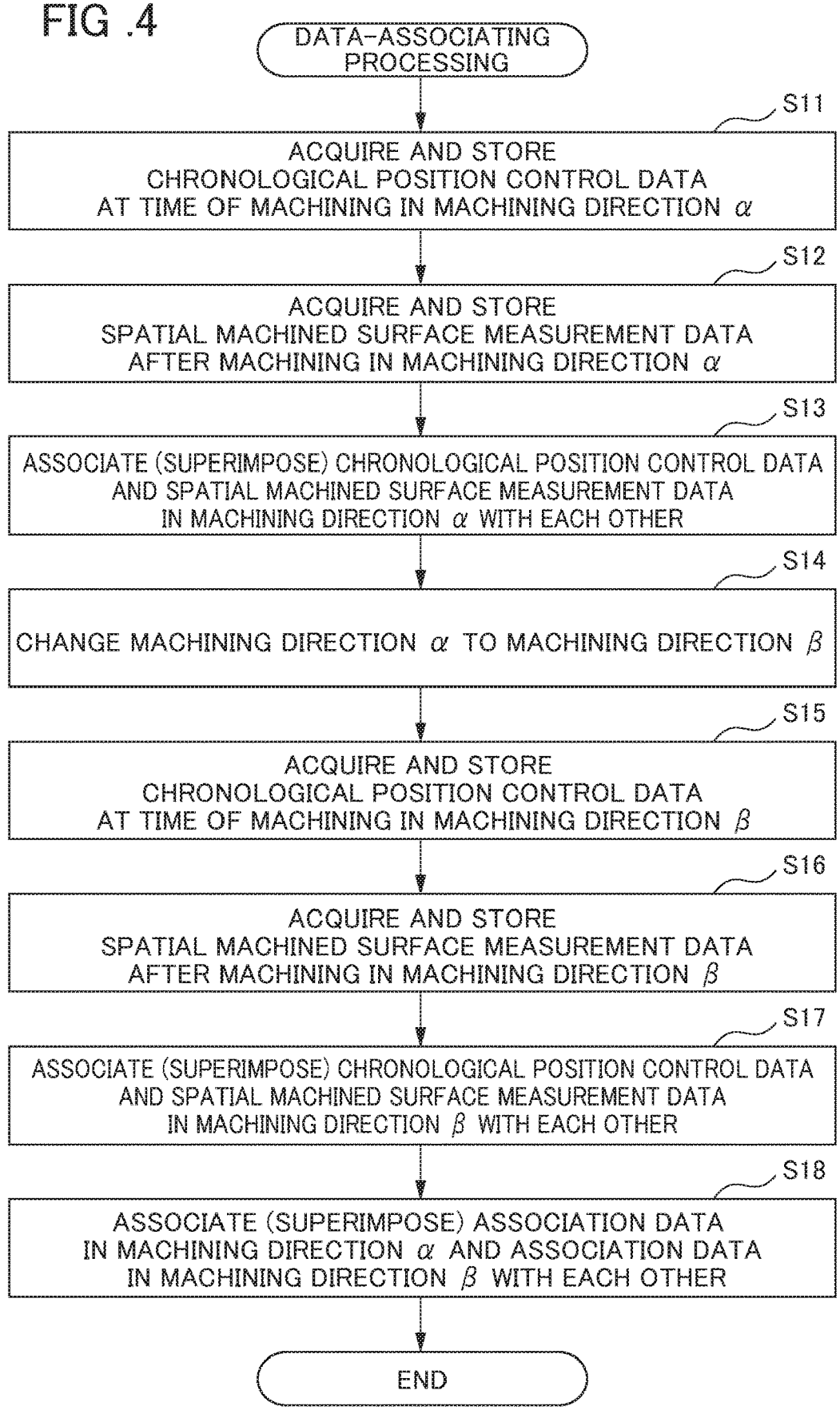
FIG. 4 is a flowchart showing data-associating processing performed by the machined surface failure analysis device of the numerical control system in the machine tool according to the embodiment of the present invention.

When the work W is machined, in step S11 of FIG. 4, the drive axis control data acquisition portion 31 acquires the chronological position control data (the position command values, the position feedback values of the work W detected by the scale 16 or the position feedback values of the servomotors M1, M2 . . . and Mn detected by the encoders E1, E2 . . . and En) (position information (machine information) of the drive axes) in the machining direction α stored in the storage portion 54 of the numerical control device 50, and stores it in the storage portion 33.

When the machining of the work W is completed, the machined surface measurement device 20 measures the machined surface of the work W. Here, in step S12, the machined surface measurement data acquisition portion 32 acquires the spatial machined surface measurement data in the machining direction α from the machined surface measurement device 20, and stores it in the storage portion 33. Specifically, the machined surface measurement data acquisition portion 32 acquires, as the machined surface measurement data, the three-dimensional image data or the position data (coordinate data).

Then, in step S13, the data-associating processing portion 34 associates the chronological position control data and the spatial machined surface measurement data in the machining direction α stored in the storage portion 33 with each other. Here, after the machining of the work, for example, the data of an image sensed by a vision sensor is three-dimensional data whereas the position control data obtained from the numerical control device 50 when the work is machined is chronological data, with the result that it is not easy to associate these types of data with each other. The inventors et al. of the present application use the following method so as to associate these types of data with each other.

Specifically, the data-associating processing portion 34 first converts the machined surface measurement data into machine coordinate data. For example, when the machined surface measurement device 20 is a vision sensor, the machined surface measurement data is image data. In this case, the data-associating processing portion 34 uses an image processing technology so as to determine the coordinate data of the work W from the image data. Then, the data-associating processing portion 34 converts the coordinate data of the work W into the machine coordinate data based on a distance between the machined surface measurement device 20 and the work W and the position (machine coordinates) and the angle (angle of view) of the machined surface measurement device 20.

On the other hand, when the machined surface measurement device 20 is an optical microscope, a laser microscope or a three-dimensional coordinate measurement device, the machined surface measurement data is position data (coordinate data).

In this case, the data-associating processing portion 34 converts the position data (coordinate data) of the work W into the machine coordinate data based on the distance between the machined surface measurement device 20 and the work W and the position (machine coordinates) and the angle (angle of view) of the machined surface measurement device 20.

Then, the data-associating processing portion 34 associates the chronological position control data (machine coordinates) when the work W is machined in the machining direction α and the spatial position data (machine coordinates) of the machined surface after the machining of the work W in the machining direction α with each other. For example, as shown in FIG. 6, the data-associating processing portion 34 produces a first work shape image W1α in the machining direction α based on the chronological position control data (machine coordinates) when the work W is machined in the machining direction α. Likewise, the data-associating processing portion 34 produces a second work shape image W2α in the machining direction α based on the spatial position data (machine coordinates) of the machined surface after the machining of the work W in the machining direction α. Then, the data-associating processing portion 34 associates the chronological position control data and the spatial position data of the machined surface in the machining direction α with each other so as to superimpose the first work shape image W1α and the second work shape image W2α on each other.

Then, in step S14, the machining program analysis portion 38 reads the machining program from the machining program production portion 51 of the numerical control device 50, and analyzes the machining program. Specifically, the machining program analysis portion 38 determines the machining direction (machining angle) β which differs by 90 degrees from the machining direction α based on the machining program, and transmits it to the machining program production portion 51 of the numerical control device 50. Here, the machining program production portion 51 of the numerical control device 50 changes the machining program so as to change the machining direction α to the machining direction β. In this way, a work W (another work on which the same machining is performed) is machined in the machining direction β by the machine tool 10.

When the work W is machined, in step S15, the drive axis control data acquisition portion 31 likewise acquires the chronological position control data (position information (machine information) of the drive axes) in the machining direction β stored in the storage portion 54 of the numerical control device 50, and stores it in the storage portion 33.

When the machining of the work W is completed, the machined surface measurement device 20 measures the machined surface of the work W. Here, in step S16, the machined surface measurement data acquisition portion 32 likewise acquires the spatial machined surface measurement data in the machining direction β from the machined surface measurement device 20, and stores it in the storage portion 33.

Then, in step S17, the data-associating processing portion 34 likewise associates the chronological position control data (machine coordinates) when the work W is machined in the machining direction β and the spatial position data (machine coordinates) of the machined surface after the machining of the work W in the machining direction β with each other. For example, as shown in FIG. 6, the data-associating processing portion 34 produces a first work shape image W1β in the machining direction β based on the chronological position control data (machine coordinates) when the work W is machined in the machining direction β. Likewise, the data-associating processing portion 34 produces a second work shape image W2β in the machining direction β based on the spatial position data (machine coordinates) of the machined surface after the machining of the work W in the machining direction β. Then, the data-associating processing portion 34 associates the chronological position control data and the spatial position data of the machined surface in the machining direction β with each other so as to superimpose the first work shape image W1β and the second work shape image W2β on each other.

Then, in step S18, as shown in FIG. 7, the data-associating processing portion 34 associates the association data of the chronological position control data and the spatial position data of the machined surface in the machining direction α and the association data of the chronological position control data and the spatial position data of the machined surface in the machining direction 1 with each other so as to superimpose the first work shape image W1α and the second work shape image W2α in the machining direction α and the first work shape image W1β and the second work shape image W2β in the machining direction β on each other. The method of superimposing the work shape images on each other and associating the types of data with each other may be the same as described above. The types of data associated with each other may be temporarily stored in the storage portion 33.

(Machined Surface Failure Analysis Processing)

In step S21 of FIG. 5, the machined surface failure detection portion 35 detects, based on the spatial machined surface measurement data in the machining direction α stored in the storage portion 33, the failure (streaks or stripes) on the machined surface of the work W in the machining direction α and the location thereof. Then, in step S22, the machined surface failure detection portion 35 detects, based on the spatial machined surface measurement data in the machining direction β stored in the storage portion 33, the failure (streaks or stripes) on the machined surface of the work W in the machining direction β and the location thereof. Specifically, when the machined surface measurement device 20 is a vision sensor, the machined surface measurement data is image data. In this case, the machined surface failure detection portion 35 detects the failure on the machined surface and the location thereof from the characteristic amount of streak and stripe on the machined surface in the image data. On the other hand, when the machined surface measurement device 20 is an optical microscope, a laser microscope or a three-dimensional coordinate measurement device, the machined surface measurement data is position data (coordinate data). In this case, machined surface failure detection portion 35 detects the failure on the machined surface and the location thereof from a small variation (such as vibration) in the position of the machined surface in the position data (coordinate data).

Then, the failure cause drive axis identification portion 36 identifies the drive axis that causes the failure, based on the position control data and the machined surface measurement data associated with each other by the data-associating processing portion 34, from the failure detected by the machined surface failure detection portion 35 and the machining direction of the position control data corresponding to the failure location. Specifically, in step S23, the failure cause drive axis identification portion 36 compares, in a failure location Dα detected by the machined surface failure detection portion 35 when the work is machined in the machining direction α, the degree of the failure at the time of machining in the machining direction α (such as the size, the depth or the number) (the failure location Dα of the second work shape image W2α in FIG. 7) and the degree of the failure at the time of machining in the machining direction f (the failure location Dα of the second work shape image W2β in FIG. 7). In step S24, the failure cause drive axis identification portion 36 compares, in a failure location Dβ detected by the machined surface failure detection portion 35 when the work is machined in the machining direction β, the degree of the failure at the time of machining in the machining direction β (the failure location Dβ of the second work shape image W2β in FIG. 7) and the degree of the failure at the time of machining in the machining direction α (the failure location Dβ of the second work shape image W2α in FIG. 7). Then, in step S25, the failure cause drive axis identification portion 36 identifies, based on the results of the comparisons, the drive axis that causes the failure based on the machining direction of the position control data corresponding to the failure location in which the degree of the failure is higher.

Then, in step S26, the optimum machining direction determination portion 37 determines the optimum machining direction (machining angle) so as to reduce the drive ratio of the drive axis that is identified by the failure cause drive shaft axis identification portion 36 and that causes the failure.

Then, in step S27, the machining program analysis portion 38 transmits the machining direction determined by the optimum machining direction determination portion 37 to the numerical control device 50. In this way, in the machining program production portion 51 of the numerical control device 50, the machining program is changed so as to set to the machining direction determined.

As described above, in the numerical control system 100 in the machine tool of the present embodiment, the machined surface failure analysis device 30 associates the chronological control data and the spatial machined surface measurement data when the work is machined in at least two machining directions α and β with each other, detects the failure on the machined surface of the work W and the location thereof based on the spatial machined surface measurement data when the work is machined in at least two machining directions α and β and identifies the drive axis that causes the failure, based on the control data and the machined surface measurement data associated with each other, from the detected failure and the machining direction of the control data corresponding to the failure location. In this way, it is possible to identify the drive axis that causes the occurrence of the failure (streaks or stripes) on the machined surface of the work W.

In the numerical control system 100 in the machine tool of the present embodiment, the machined surface failure analysis device 30 determines the machining direction so as to reduce the drive ratio of the drive axis that is identified and that causes the failure. Then, the numerical control device 50 changes, according to the machining direction determined by the machined surface failure analysis device 30, the machining program so as to change the machining direction. In this way, in the subsequent rounds of machining, it is possible to reduce the occurrence of the failure (streaks or stripes) on the machined surface of the work, and thus it is possible to enhance the quality of the machined surface.

Although the embodiment of the present invention is described above, the present invention is not limited to the embodiment described above. The effects described in the present embodiment are simply those which are obtained by listing the most preferred effects produced from the present invention, and thus the effects of the present invention are not limited to those described in the present embodiment.

For example, in the embodiment described above, only the machining direction is changed without the work being rotated.

Figure 8:
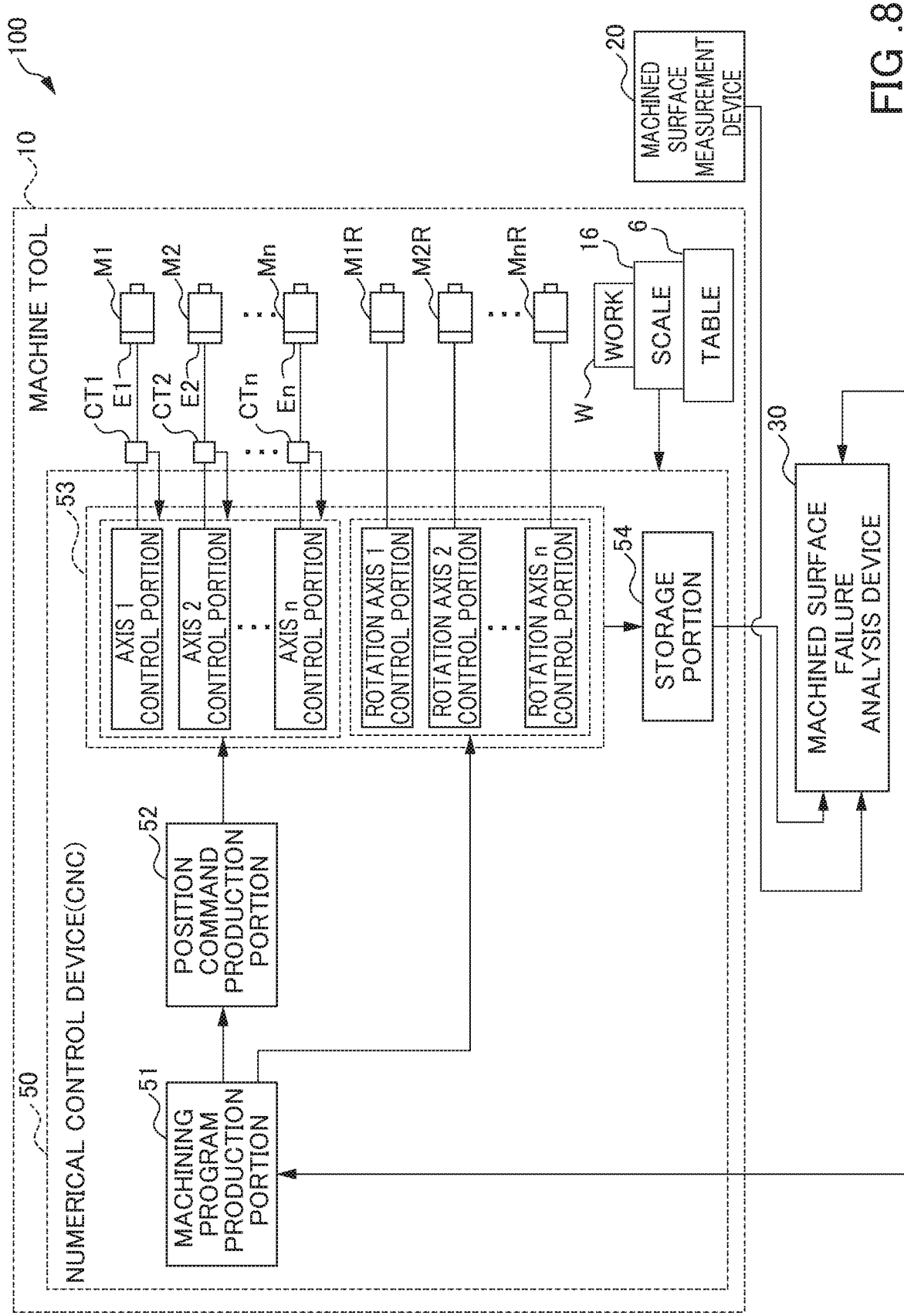
FIG. 8 is a diagram showing the configuration of a numerical control system in a machine tool according to a variation of the present invention.

In other words, the machining direction with respect to the work is changed. However, the present invention is not limited to this configuration, and for example, the work may be rotated according to the change of the machining direction such that the machining direction with respect to the work is not changed. For example, as shown in FIG. 8, the machine tool 10 includes a plurality of servomotors M1R, M2R . . . and MnR for rotating, in the direction of the C axis (see FIG. 1), the table 6 on which the work W is mounted, and the numerical control device 50 includes the individual rotation axis control portion 53 for driving and controlling the servomotors M1R, M2R . . . and MnR. Then, the machining program production portion 51 of the numerical control device 50 controls, according to the change of the machining direction, the individual rotation axis control portion 53 so as to rotate the table 6.

Although in the embodiment described above, the machining program production portion 51 of the numerical control device 50 changes the machining program, a CAM which produces the machining program from a CAD drawing may produce the changed machining program.

Although in the embodiment described above, the machined surface measurement data when the work is machined in the machining directions α and β which differ from each other by 90 degrees is used so as to identify the drive axis that causes the occurrence of the failure on the machined surface, machined surface measurement data when the work is machined in machining directions which differ from each other by an angle other than 90 degrees may be used so as to identify the drive axis that causes the occurrence of the failure on the machined surface.

Although in the embodiment described above, the machined surface measurement data when the work is machined in the two different machining directions α and β is used so as to identify the drive axis that causes the occurrence of the failure on the machined surface, machined surface measurement data when the work is machined in three or more different machining directions may be used so as to identify the drive axis that causes the occurrence of the failure on the machined surface.

In the embodiment described above, the numerical control system 100 is described which identifies the drive axis that causes (vibration) the occurrence of the failure such as streaks or stripes produced on the machined surface of the work W. However, the present invention is not limited to this configuration, and can be applied to the identification of drive axes that cause the occurrence of various failures on the machined surface. For example, the machined surface failure analysis device 30 may identify a drive axis that causes (a delay in the reversal of the direction of drive of the drive axis caused such as by a backlash or play) the occurrence of a failure of protrusions produced on the machined surface of the work W. The inventors et al. of the present application have obtained findings that when the failure is caused by a delay in the reversal resulting from a backlash or play, the direction of drive of the drive axis (the machining direction) is slightly changed (for example, by a few degrees), and thus it is possible to reduce the occurrence of protrusions. In this way, the machined surface failure analysis device 30 may change the machining direction only by a few degrees in order to reduce the occurrence of protrusions.

Although in the embodiment described above, the data-associating processing portion 34 of the machined surface failure analysis device 30 directly associates the position control data itself from the numerical control device 50 and the machined surface measurement data from the machined surface measurement device 20 with each other in order to identify the position control data corresponding to the machined surface measurement data of the failure location.

However, the data-associating processing portion 34 may indirectly associate the speed control data from the numerical control device 50 and the machined surface measurement data with each other, identify the speed control data corresponding to the machined surface measurement data of the failure location and identify the position control data corresponding to the speed control data. In this case, the drive axis control data acquisition portion 31 and the data-associating processing portion 34 on the machined surface failure analysis device 30 may be functioned and operated as follows.

The drive axis control data acquisition portion 31 acquires, from the numerical control device 50, as the chronological drive axis control data when the work W is machined, the speed control data (speed command values, speed feedback values) and the position control data (position command values, position feedback values), and stores them in the storage portion 33 (steps S11 and S15 of FIG. 4).

The data-associating processing portion 34 associates the chronological speed control data stored in the storage portion 33 and the spatial machined surface measurement data with each other (steps S13 and S17 of FIG. 4). Here, for example, the machine tool machines the entire work W while reciprocating the tool T with respect to the work W. Here, when the tool T makes contact with the work W and when the tool T is separated from the work W, the speed command values and the speed feedback values are varied. In this way, the point of a variation in the speed command values or the point of a variation in the speed feedback values is detected, and thus it is possible to detect the edge position of the work W, that is, the outline of the work W.

Since the speed command values and the speed feedback values are also varied according to acceleration/deceleration, in the present embodiment, a value obtained by subtracting a value corresponding to a variation in acceleration/deceleration from the speed command values and the current feedback values is used. In this way, a return point when the tool T is reciprocated with respect to the work W is prevented from being erroneously detected as the edge position of the work W. When the tool T is not reciprocated with respect to the work W, the speed command values and the speed feedback values may be used without being processed.

Specifically, the data-associating processing portion 34 detects, based on the point of a variation in the value obtained by subtracting the value corresponding to a variation in acceleration/deceleration from the chronological speed control data, as the edge position of the work W, a machining start position and a machining completion position, and thereby produces the first work shape (outline) images W1α and W1β as shown in FIG. 6.

The data-associating processing portion 34 also detects, based on the spatial machined surface measurement data after the machining of the work W, the edge position of the work, and thereby produces the second work shape (outline) images W2α and W2β as shown in FIG. 6. For example, when the machined surface measurement device 20 is a vision sensor, the machined surface measurement data is image data. In this case, the data-associating processing portion 34 uses an image processing technology so as to detect the edge position of the work W from the image data and thereby produces the second work shape (outline) images W2α and W2β. On the other hand, when the machined surface measurement device 20 is an optical microscope, a laser microscope or a three-dimensional coordinate measurement device, the machined surface measurement data is position data (coordinate data). In this case, the data-associating processing portion 34 detects the edge position of the work W from the position data (coordinate data) and thereby produces the second work shape (outline) images W2α and W2β.

Then, the data-associating processing portion 34 associates the chronological speed control data and the spatial machined surface measurement data of the machined surface with each other so as to superimpose the first work shape images W1α and W1β and the second work shape images W2α and W2β on each other.

Here, in the numerical control device 50, the speed control data and the position control data are associated with each other. In this way, the data-associating processing portion 34 associates the chronological speed control data and the position control data stored in the storage portion 33 with each other so as to associate the chronological position control data and the spatial machined surface measurement data of the machined surface with each other.

In the embodiment described above, the data-associating processing portion 34 may indirectly associate the torque control data from the numerical control device 50 and the machined surface measurement data with each other, identify the torque control data corresponding to the machined surface measurement data of the failure location and identify the position control data corresponding to the torque control data. In this case, as in the case of the speed control data described above, based on the point of a variation in the torque control data, the torque control data corresponding to the machined surface measurement data of the failure location may be identified.

Although in the embodiment described above, the machined surface failure detection portion 35 of the machined surface failure analysis device 30 automatically detects the failure on the machined surface and the location thereof from the image data or the position data (coordinate data) of the work W (machined surface) from the machined surface measurement device 20, they may be detected manually. For example, the measurement result (three-dimensional image data or position data) of the machined surface measurement device 20 may be displayed on a monitor or the like, the failure and the location thereof may be visually detected by the user and thus the failure location detected may be manually input to the machined surface failure analysis device 30.

EXPLANATION OF REFERENCE NUMERALS 2 head
3 support member
4 support column
5 base
6 table
10 machine tool
16 scale
20 machined surface measurement device
30 machined surface failure analysis device (analysis device)
31 drive axis control data acquisition portion (first acquisition portion)
32 machined surface measurement data acquisition portion (second acquisition portion)
33, 54 storage portion
34 data-associating processing portion
35 machined surface failure detection portion
36 failure cause drive axis identification portion (identification portion)
37 optimum machining direction determination portion (machining direction determination portion)
38 machining program analysis portion
50 numerical control device (control device)
51 machining program production portion
52 position command production portion
53 individual axis control portion
100 numerical control system (control system)
CT1, CT2 . . . and CTn current detector
E1, E2 . . . and En encoder
M1, M2 . . . and Mn servomotors
T tool
W work

What is claimed is:

1. A control system of a machine tool which machines a work, the control system comprising:
a control device which controls drive axes of the machine tool based on control data;
a machined surface measurement device which measures a machined surface of the work; and
an analysis device which analyzes a failure on the machined surface of the work,
wherein the analysis device includes:
a first acquisition portion which acquires, from the control device, chronological control data when the work is machined;
a second acquisition portion which acquires spatial machined surface measurement data after the machining of the work measured by the machined surface measurement device;
a storage portion which stores the chronological control data acquired by the first acquisition portion and the spatial machined surface measurement data acquired by the second acquisition portion when the work is machined in at least two machining directions;
a data-associating processing portion which associates, with each other, the chronological control data and the spatial machined surface measurement data stored in the storage portion when the work is machined in at least the two machining directions;
a machined surface failure detection portion which detects the failure on the machined surface of the work and a location thereof based on the spatial machined surface measurement data stored in the storage portion when the work is machined in at least the two machining directions; and an identification portion which identifies the drive axis that causes the failure detected by the machined surface failure detection portion based on the control data and the machined surface measurement data associated with each other by the data-associating processing portion from the failure detected by the machined surface failure detection portion and the machining direction of the control data corresponding to the failure location detected by the machined surface failure detection portion.

2. The control system of the machine tool according to claim 1, wherein the analysis device further includes a machining program analysis portion which analyzes a machining program in the control device so as to set at least the two machining directions, and the control device changes the machining program according to the machining directions set by the machining program analysis portion so as to change the machining direction.

3. The control system of the machine tool according to claim 1, wherein the analysis device further includes a machining direction determination portion which determines the machining direction so as to reduce a drive ratio of the drive axis that causes the failure identified by the identification portion, and the control device changes the machining program according to the machining direction determined by the machining direction determination portion so as to change the machining direction.

4. The control system of the machine tool according to claim 3, wherein the control device changes an angle of the work according to the change of the machining direction.

5. The control system of the machine tool according to claim 1, wherein the control data acquired by the first acquisition portion is position control data of the drive axes of the machine tool, and the data-associating processing portion:

produces a first work shape image based on the chronological position control data;

produces a second work shape image based on the spatial machined surface measurement data; and associates the chronological position control data and the spatial machined surface measurement data with each other so as to superimpose the first work shape image and the second work shape image on each other.

6. The control system of the machine tool according to claim 5, wherein the chronological position control data is machine coordinate information, and the spatial machined surface measurement data is machine coordinate information which is calculated based on a machine coordinate of the machined surface measurement device.

7. The control system of the machine tool according to claim 1, wherein the first acquisition portion acquires, from the control device, chronological position control data and chronological speed control data when the work is machined which are position control data and speed control data of the drive axes of the machine tool and which are associated with each other, and the data-associating processing portion:

detects, based on a variation in the chronological speed control data, as an edge position of the work, a machining start position and a machining completion position so as to produce a first work shape image;

detects, based on the spatial machined surface measurement data, an edge position of the work so as to produce a second work shape image;

associates the chronological speed control data and the spatial machined surface measurement data with each other so as to superimpose the edge position of the first work shape image and the edge position of the second work shape image on each other; and associates the chronological speed control data and the chronological position control data with each other so as to associate the chronological position control data and the spatial machined surface measurement data with each other.

8. The control system of the machine tool according to claim 1, wherein the first acquisition portion acquires, from the control device, chronological position control data and chronological speed control data when the work is machined which are position control data and speed control data of the drive axes of the machine tool and which are associated with each other, and the data-associating processing portion:

detects, based on a variation in a value obtained by subtracting a value corresponding to a variation in acceleration/deceleration from the chronological speed control data, as an edge position of the work, a machining start position and a machining completion position so as to produce a first work shape image;

detects, based on the spatial machined surface measurement data, an edge position of the work so as to produce a second work shape image;

associates the chronological speed control data and the spatial machined surface measurement data with each other so as to superimpose the edge position of the first work shape image and the edge position of the second work shape image on each other; and associates the chronological speed control data and the chronological position control data with each other so as to associate the chronological position control data and the spatial machined surface measurement data with each other.

9. The control system of the machine tool according to claim 1, wherein the failure on the machined surface of the work is a streak or a stripe or a protrusion.

10. The control system of the machine tool according to claim 1, wherein the control data is a command value or a feedback value, the command value is a position command value, a speed command value or a torque command value and the feedback value is a position feedback value, a speed feedback value or a current feedback value.

* * * * *